April 27, 1965
W. C. W. DUNCAN
3,181,044
CAPACITOR MOUNT
Filed Nov. 14, 1962
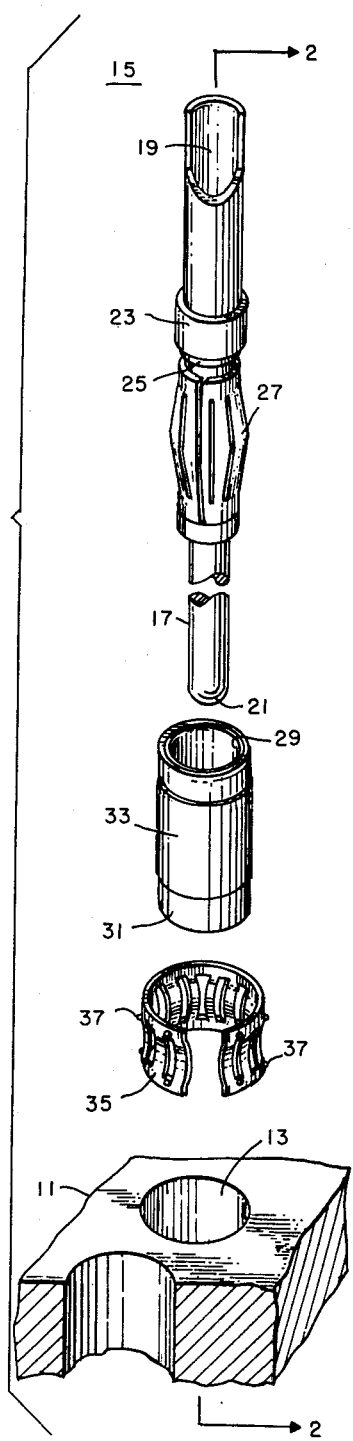
FIG. I
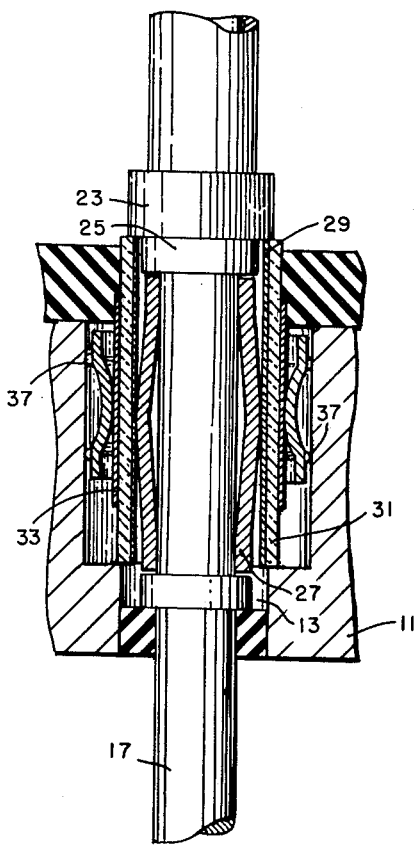
FIG. 2
INVENTOR,
WILLIAM C. W. DUNCAN
BY Harry M. Saragovitz
ATTORNEY.

United States Patent Office 3,181,044
Patented Apr. 27, 1965

3,181,044
CAPACITOR MOUNT
William C. W. Duncan, Costa Mesa, Calif., assignor to the United States of America as represented by the Secretary of the Army
Filed Nov. 14, 1962, Ser. No. 238,078
1 Claim. (Cl. 317—242)

The present invention relates to capacitors and more particularly it relates to a capacitor mount that permits of easy insertion and withdrawl of a capacitor from an electrical assembly.

While the invention is specifically described in this application as a mounting for a tubular feed-through capacitor, it will be apparent from the detailed description of the mounting that it can be used in the support of other types of electronic equipments.

As is well known in the art, capacitors, either in whole or in part, are soldered to their electrical circuits. While in most usages such form of solder seal is adequate and satisfactory, it has been found that in many instances the use of a solder seal has certain inherent disadvantages. Thus for example it has been known that capacitors secured by solder seal are too rigidly mounted in equipments that are subjected to considerable vibration and shock, such as a radio set in a fast moving vehicle. In such instances excessive vibration may cause a break in the capacitor solder seal. In other instances it has been found that the heat required to apply the solder seal may adversely affect the ceramic dielectric used as a component part of many capacitor assemblies. Such application of heat may cause the ceramic to become unduly brittle which may result in cracking of such ceramic dielectric. It has been found that capacitors secured by solder are difficult to remove for replacement and/or repair, particularly in those instances where a series of small capacitors are used in a hard to reach location.

Accordingly, one of the primary objects of the present invention is to provide a mechanical, solderless method of mounting and electrically connecting a capacitor in a connector or like equipment.

Another object of the invention is to provide a capacitor mounting that is semi-rigid when secured to thereby yield to undue stress shock or vibration to which the equipment containing the capacitors may be subjected.

Still another object of the invention is to provide a capacitor mounting that permits of easy insertion and withdrawl of the capacitor as desired.

According to the present invention, the mounting consists essentially of two electrically conductive mounting and securing elements, namely an outer and inner spring. The outer spring is in the form of an open-ended tube with a longitudinal gap or slot. The outside diameter of said outer spring is slightly larger when distended than the hole of the chassis or mounting plate in which it is positioned. A number of rectangular slots are formed in the wall of the tubular spring and the bars so caused are formed radially inward to form a tubular spring of an "hour-glass" shape. A number of protrusions are lanced radially outward at both the peripheral edges of the spring to aid in retaining the spring within the mounting plate as hereinafter described. The inner mounting element is in the form of a banana spring having rectangular slots in its wall to form bars that are formed radially outward that contact the inner electrode of the capacitor through which it is inserted as hereinafter described.

To enable the invention to be fully understood, it will now be described with reference to the accompanying drawing, in which FIGURE 1 is an exploded view of the component parts of a capacitor assembly including its securing means and mounting plate; and FIGURE 2 is a cross section of the capacitor, taken on the line 2—2 of FIG. 1, when assembled.

In FIGURE 1 there is shown a mounting plate 11 which forms part of the equipment within which the capacitors are contained. The plate 11 has an opening 13 within which the capacitor is confined.

The capacitor assembly generally designated as 15 includes, in part, a rod 17 which terminates at one end in an enlarged open ended tubular socket 19 and its other ends in a pin contact 21. At its lower terminus, as viewed in FIGURE 1, the enlarged portion includes an annular ring 23 to provide a shoulder 25. In abutment with the shoulder 25 is a tubular banana spring contact 27 which firmly grips and is in intimate contact with the rod 17. As can be seen in FIGURE 1, the spring 27 is tubular in configuration provided with a series of longitudinal rectangular slots thereby shaping bars which are formed radially outward. The bars of the spring 27 are in electrical contact with a metallic electrically conductive film 29 which constitutes the inner electrode of the capacitor. The film 29 forms the inner surface of a ceramic dielectric tube 31. The tube 31 is of sufficient length to completely surround and encircle the spring 27 and has an inside diameter slightly smaller than widest outside diameter of the spring 27 whereby the bars of the spring when compressed will firmly engage the metallic film 29 when the capacitor is assembled, as seen in FIGURE 2. The outer electrode of the capacitor is a conductive metallic ring 33 centrally located on the outer surface of dielectric tube 31. Completing the capacitor assembly is a spring 35 which is adapted for confinement in the opening 13 of the mounting plate 11. As shown in FIGURE 1, the spring 35 is in the form of an open-ended tube having a longitudinal slit and having an outside diameter slightly larger, when distended, than the opening. The spring 35 is also provided with a series of longitudinal rectangular slots to fashion bars that are formed radially inward to form an hour-glass shape. The spring 35 is further provided with a series of bead-like protrusions 37 on the top and bottom peripheral edges of the spring which serve as retaining points in securely holding the spring when it is confined in the opening 13.

To fit together the component parts of the capacitor assembly of this invention the spring 35 is first securely inserted into the opening 13 of the mounting plate. The pin 17 including the spring 27 firmly wedged against the shoulder 25, and the dielectric tube surrounding the spring can then be inserted into and through the spring 35. It will be apparent that the base of the spring 35 that flare radially inwardly will securely hold the dielectric tube 31 and the rod 17 therein, yet at the same time be elastic enough to allow withdrawal of the rod when desired. From the description of the device herein it is apparent that there is provided a mounting and securing means for a capacitor that eliminates the use of any solder or other permanent means for securing the capacitor within its mounting framework.

What is claimed is:

A tubular capacitor assembly comprising a tubular capacitor having inner and outer electrode contact surfaces, a terminal connector element separable from said tubular capacitor, a mounting means having an opening therein for receiving said tubular capacitor assembly including a first spring of tubular configuration that is in intimate contact with the outer electrode of said capacitor and having an outside diameter slightly larger, when distended, than the opening in said mounting means and having a plurality of longitudinal slots on its peripheral walls to form a series of ribs that flare radially inwardly and adapted to be securely confined in said opening, and further including a second spring of general tubular configuration that is in intimate contact with the inner electrode of said capacitor and having a series of longitudinal slots in its peripheral wall to form a series of ribs that flare outwardly and having its largest diameter slightly larger when distended than the inside diameter of said tubular capacitor within which said terminal connector is insertable.

References Cited by the Examiner
UNITED STATES PATENTS

| | | | |
|---|---|---|---|
| 2,490,317 | 12/49 | Ostrak | 339—262 |
| 2,625,582 | 1/53 | Heibel | 339—143 X |
| 2,762,989 | 9/56 | Johnson | 339—258 |
| 3,031,641 | 4/62 | Camzi | 339—252 |

JOHN F. BURNS, *Primary Examiner.*
JOHN P. WILDMAN, *Examiner.*